(12) United States Patent
Lee et al.

(10) Patent No.: US 10,235,925 B2
(45) Date of Patent: Mar. 19, 2019

(54) GATE DRIVER AND DISPLAY DEVICE INCLUDING THE SAME

(71) Applicant: SAMSUNG DISPLAY CO., LTD., Yongin-si, Gyeonggi-do (KR)

(72) Inventors: Seung-Jae Lee, Anyang-si (KR); Tae-Jin Kim, Hwaseong-si (KR); Sung-Yeon Cho, Hwaseong-si (KR); Myung-Ho Lee, Anyang-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 40 days.

(21) Appl. No.: 15/230,518

(22) Filed: Aug. 8, 2016

(65) Prior Publication Data

US 2017/0270849 A1 Sep. 21, 2017

(30) Foreign Application Priority Data

Mar. 15, 2016 (KR) ........................ 10-2016-0030710

(51) Int. Cl.
*G06F 1/16* (2006.01)
*G09G 3/20* (2006.01)
*G09G 3/3266* (2016.01)

(52) U.S. Cl.
CPC ......... *G09G 3/2092* (2013.01); *G06F 1/1652* (2013.01); *G09G 3/3266* (2013.01); *G09G 2310/0286* (2013.01); *G09G 2310/08* (2013.01); *G09G 2340/0407* (2013.01); *G09G 2380/02* (2013.01)

(58) Field of Classification Search
None
See application file for complete search history.

(56) References Cited

U.S. PATENT DOCUMENTS

| 6,175,352 | B1 | 1/2001 | Kay et al. |
| 7,378,608 | B2 | 5/2008 | Marmaropoulos et al. |
| 2010/0002402 | A1 | 1/2010 | Rogers et al. |
| 2011/0227883 | A1 | 9/2011 | Chung |
| 2013/0342439 | A1* | 12/2013 | Kwack ................. G09G 3/3225 345/156 |
| 2016/0055783 | A1 | 2/2016 | Lee et al. |
| 2016/0055798 | A1 | 2/2016 | Song et al. |
| 2017/0148419 | A1* | 5/2017 | Zhang ..................... G09F 9/301 |

FOREIGN PATENT DOCUMENTS

KR 10-2016-0022976 A 3/2016

OTHER PUBLICATIONS

Search Report dated May 23, 2017 from the European Patent Office in the corresponding European Patent Application No. 16199937.0.

* cited by examiner

*Primary Examiner* — Nitin Patel
*Assistant Examiner* — Amen W Bogale
(74) *Attorney, Agent, or Firm* — Lee & Morse P.C.

(57) ABSTRACT

A gate driver includes a plurality of shift registers and a plurality of connection controllers. The shift registers are connected to a plurality of gate lines of a stretchable display panel, respectively. The shift registers are grouped into a plurality of shift register groups. N adjacent shift registers constitute each of the shift register groups, where N is an integer greater than or equal to 2. The connection controllers change a connection structure of the N adjacent shift registers included in the each of the shift register groups according to whether the stretchable display panel is stretched.

20 Claims, 14 Drawing Sheets

GATE DRIVER AND DISPLAY DEVICE INCLUDING THE SAME

CROSS-REFERENCE TO RELATED APPLICATION

Korean Patent Application No. 10-2016-0030710, filed on Mar. 15, 2016, in the Korean Intellectual Property Office, and entitled: "Gate Driver and Display Device Including the Same," is incorporated by reference herein in its entirety.

BACKGROUND

1. Field

Example embodiments relate generally to a display device. More particularly, embodiments of the present inventive concept relate to a gate driver that drives a stretchable display panel of which a size (or area) can be changed based on its elasticity and flexibility and a display device including the gate driver.

2. Description of the Related Art

A display device including a stretchable display panel (or, also referred to as a flexible display panel, a bendable display panel, etc.) allows a size (or area) of the stretchable display panel to be changed because the stretchable display panel has elasticity and flexibility. However, as the size of the stretchable display panel is changed based on its elasticity and flexibility, a distance (or space, gap, etc.) between pixels included in the stretchable display panel and a size of each of the pixels may be changed. For example, since the distance between the pixels and the size of each of the pixels increases as the stretchable display panel is stretched, a pixels-per-inch (PPI) (or pixel density) of a stretched panel region of the stretchable display panel may be decreased. Thus, in a conventional display device including the stretchable display panel, image distortion may occur (i.e., an image displayed on the stretchable display panel may be stretched as the stretchable display panel is stretched). In addition, luminance degradation may occur because the pixel density of the stretched panel region of the stretchable display panel is decreased.

SUMMARY

According to an aspect of example embodiments, a gate driver may include a plurality of shift registers connected to a plurality of gate lines of a stretchable display panel, respectively, the shift registers being grouped into a plurality of shift register groups, N adjacent shift registers constituting each of the shift register groups, where N is an integer greater than or equal to 2, and a plurality of connection controllers to change a connection structure of the N adjacent shift registers included in the each of the shift register groups according to whether the stretchable display panel is stretched.

In example embodiments, the shift register groups may be connected in a cascade form to sequentially output a gate signal.

In example embodiments, the connection controllers may connect the N adjacent shift registers included in the (k)th shift register group in a cascade form when a panel region connected to the (k)th shift register group is stretched, where k is an integer greater than or equal to 1.

In example embodiments, the N adjacent shift registers included in the (k)th shift register group may sequentially output a gate signal via the gate lines when the panel region connected to the (k)th shift register group is stretched.

In example embodiments, the connection controllers may connect the N adjacent shift registers included in the (k)th shift register group in a parallel form when a panel region connected to the (k)th shift register group is not stretched, where k is an integer greater than or equal to 1.

In example embodiments, the N adjacent shift registers included in the (k)th shift register group may simultaneously output a gate signal via the gate lines when the panel region connected to the (k)th shift register group is not stretched.

In example embodiments, each of the connection controllers may include a plurality of switches that are turned on or off based on a stretch detection signal indicating whether the stretchable display panel is stretched.

In example embodiments, the stretch detection signal may indicate that a panel region connected to the (k)th shift register group is stretched when a distance between the gate lines included in the panel region connected to the (k)th shift register group is longer than or equal to a reference distance, where k is an integer greater than or equal to 1. In addition, the stretch detection signal may indicate that the panel region connected to the (k)th shift register group is not stretched when the distance between the gate lines included in the panel region connected to the (k)th shift register group is shorter than the reference distance.

In example embodiments, each of the switches may be implemented by a p-channel metal oxide semiconductor (PMOS) transistor, an n-channel metal oxide semiconductor (NMOS) transistor, or a complementary metal oxide semiconductor (CMOS) transistor.

In example embodiments, the gate driver may be stretched as the stretchable display panel is stretched.

In example embodiments, each of the connection controllers may include a plurality of conductive connecting lines that are physically connected or separated according to whether the stretchable display panel is stretched.

According to an aspect of example embodiments, a display device may include a stretchable display panel including a plurality of pixels, a gate driver configured to provide a gate signal to the stretchable display panel via a plurality of gate lines, a data driver configured to provide a data signal corresponding to image data to the stretchable display panel via a plurality of data lines, and a timing controller configured to control the gate driver and the data driver. Here, the gate driver may include a plurality of shift registers connected to the gate lines of the stretchable display panel, respectively, the shift registers being grouped into a plurality of shift register groups, N adjacent shift registers constituting each of the shift register groups, where N is an integer greater than or equal to 2, and a plurality of connection controllers to change a connection structure of the N adjacent shift registers included in the each of the shift register groups according to whether the stretchable display panel is stretched.

In example embodiments, the display device may further include a data compensator configured to compensate for the image data according to whether the stretchable display panel is stretched.

In example embodiments, the data compensator may be located inside the timing controller or the data driver.

In example embodiments, the data compensator may be located outside the timing controller and the data driver.

In example embodiments, the shift register groups may be connected in a cascade form to sequentially output the gate signal.

In example embodiments, the connection controllers may connect the N adjacent shift registers included in the (k)th shift register group in a cascade form when a panel region connected to the (k)th shift register group is stretched, where k is an integer greater than or equal to 1.

In example embodiments, the N adjacent shift registers included in the (k)th shift register group may sequentially output the gate signal via the gate lines when the panel region connected to the (k)th shift register group is stretched.

In example embodiments, the connection controllers may connect the N adjacent shift registers included in the (k)th shift register group in a parallel form when a panel region connected to the (k)th shift register group is not stretched, where k is an integer greater than or equal to 1.

In example embodiments, the N adjacent shift registers included in the (k)th shift register group may simultaneously output the gate signal via the gate lines when the panel region connected to the (k)th shift register group is not stretched.

Therefore, a gate driver according to example embodiments may maintain a pixels-per-inch (PPI) of a stretched panel region of a stretchable display panel when the stretchable display panel is stretched by grouping adjacent shift registers into shift register groups, by arranging the shift registers included in each of the shift register groups in a cascade form when the stretchable display panel is stretched, and by arranging the shift registers included in each of the shift register groups in a parallel form when the stretchable display panel is not stretched.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Figure 1:
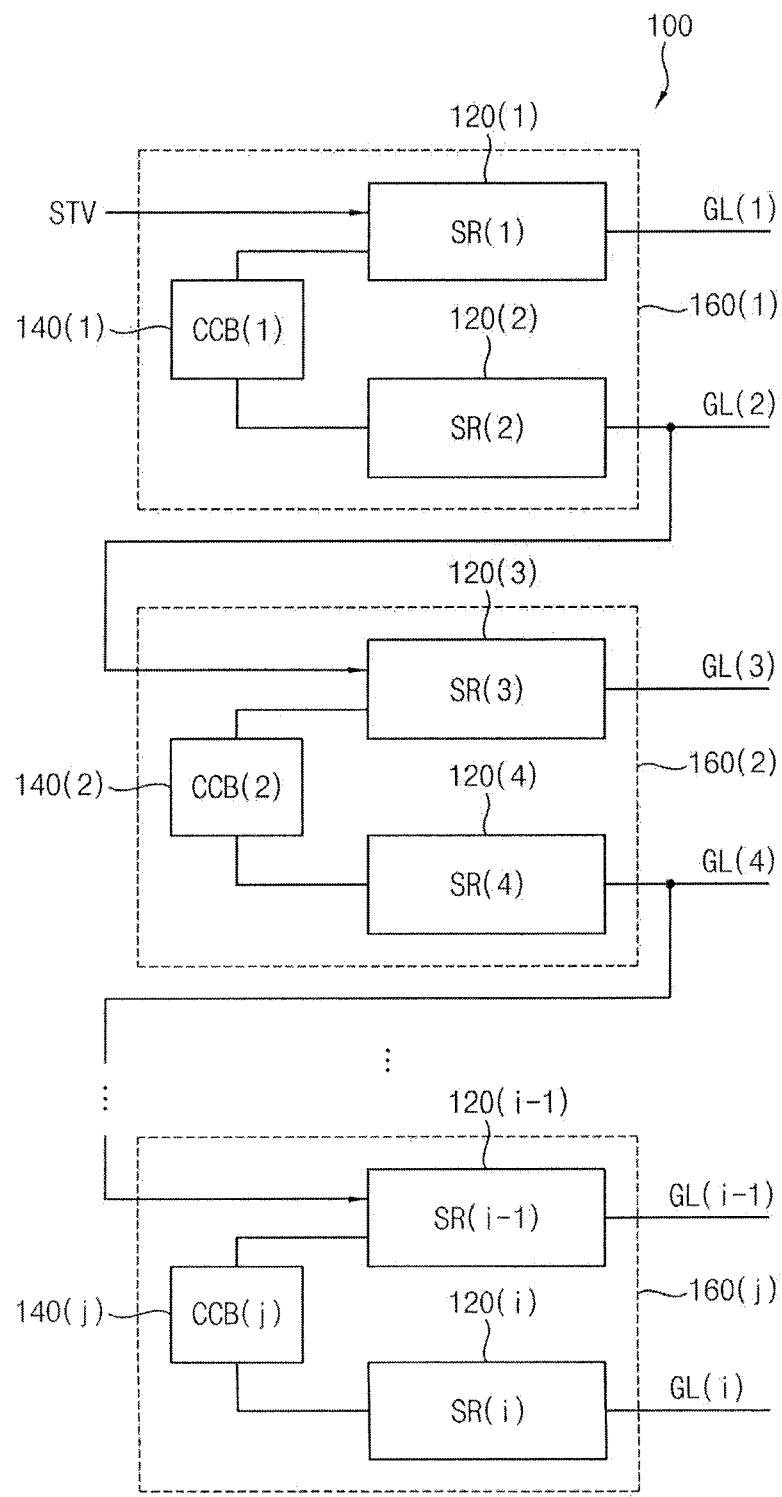
FIG. 1 illustrates a block diagram of a gate driver according to example embodiments.
Figure 2:
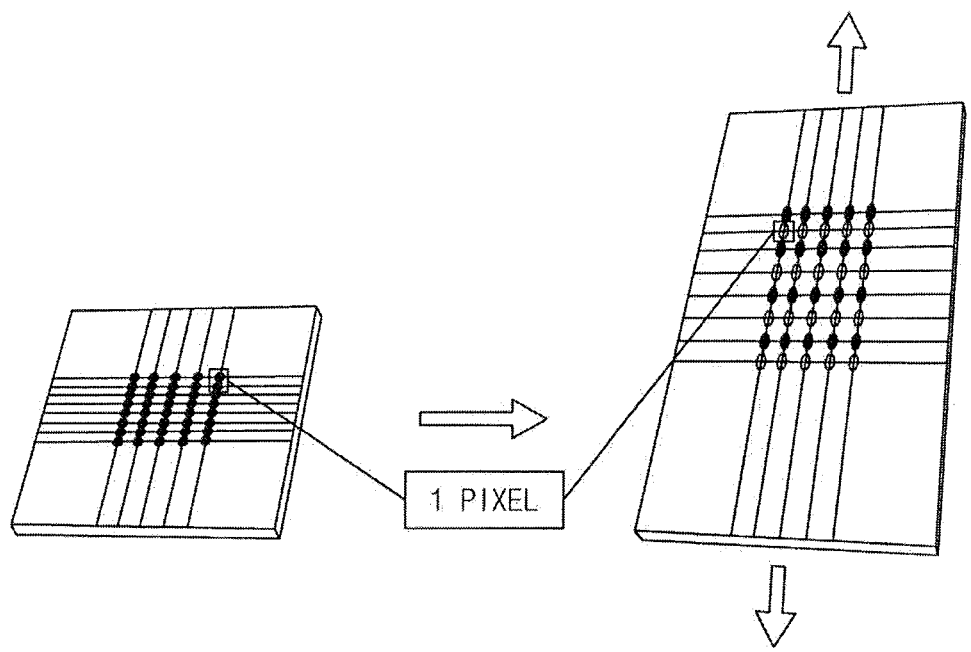
FIG. 2 illustrates a diagram for describing an example in which a distance between pixels included in a stretchable display panel driven by the gate driver of FIG. 1 and a size of each of the pixels are changed as the stretchable display panel is stretched.
Figure 3:
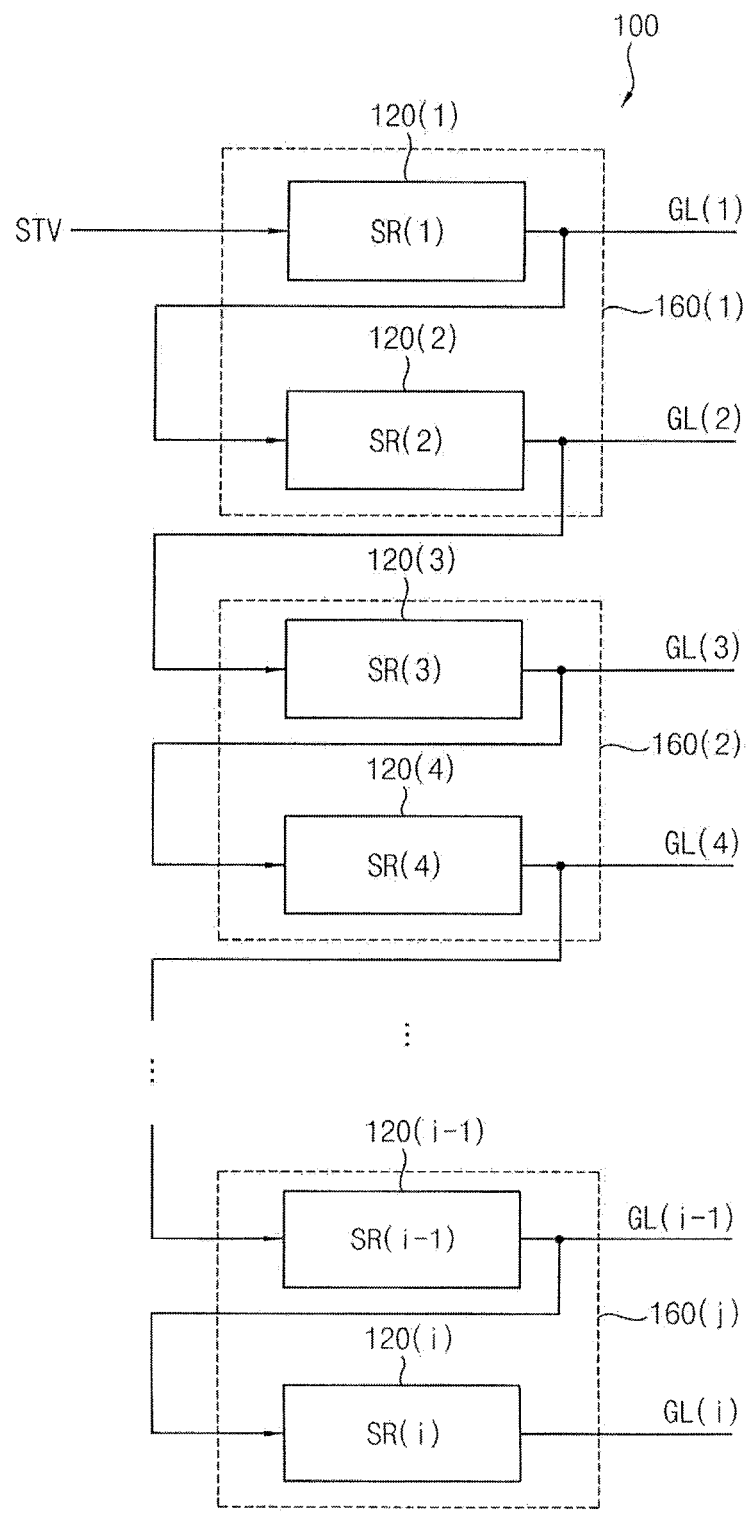
FIG. 3 illustrates a diagram of an internal structure of the gate driver of FIG. 1 when a stretchable display panel is stretched.
Figure 4:
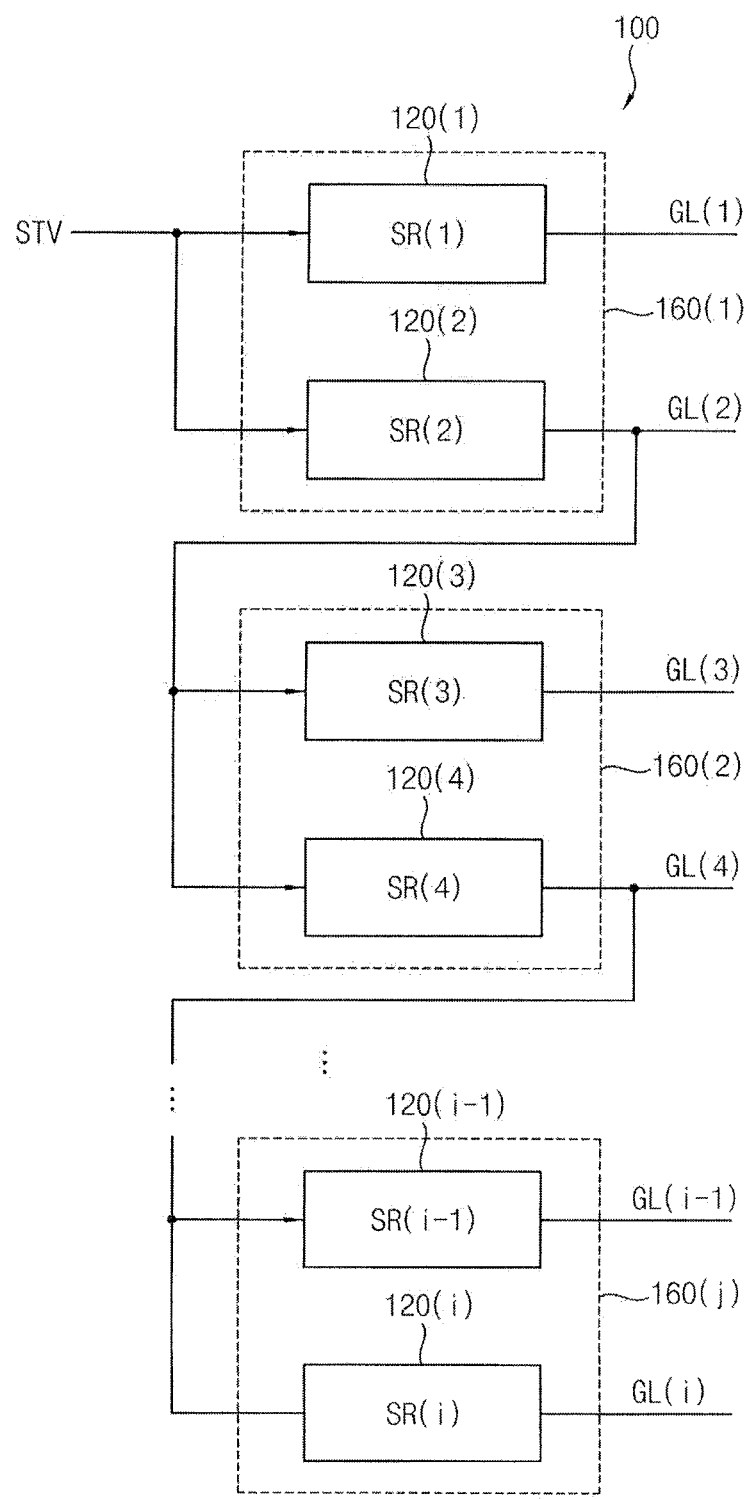
FIG. 4 illustrates a diagram of an internal structure of the gate driver of FIG. 1 when a stretchable display panel is not stretched.

FIG. 1 is a block diagram illustrating a gate driver according to example embodiments. FIG. 2 is a diagram for describing an example in which a distance between pixels included in a stretchable display panel driven by the gate driver of FIG. 1 and a size of each of the pixels are changed as the stretchable display panel is stretched. FIG. 3 is a diagram illustrating an internal structure of the gate driver of FIG. 1 when a stretchable display panel is stretched. FIG. 4 is a diagram illustrating an internal structure of the gate driver of FIG. 1 when a stretchable display panel is not stretched.

Referring to FIGS. 1 through 4, the gate driver 100 may include first through (i)th shift registers 120(1) through 120(i), where i is an integer greater than or equal to 2, and first through (j)th connection control blocks 140(1) through 140(j), where j is an integer greater than or equal to 2. Here, the gate driver 100 may provide a gate signal to a stretchable display panel via first through (i)th gate lines GL(1) through GL(i). For example, the gate driver 100 may provide a gate signal to the stretchable display panel via the first through (i)th gate lines GL(1) through GL(i) in response to a gate driving start signal STV input to the first shift register 120(1).

The first through (i)th shift registers 120(1) through 120(i) may be connected to the first through (i)th gate lines GL(1) through GL(i) of the stretchable display panel, respectively. As illustrated in FIG. 1, the first through (i)th shift registers 120(1) through 120(i) may be grouped into first through (j)th shift register groups 160(1) through 160(j). Here, N shift registers that are adjacent to each other may constitute one shift register group 160(1) through 160(j), where N is an integer greater than or equal to 2. For convenience of description, although it is illustrated in FIGS. 1 through 4 that two adjacent shift registers 120(1) through 120(i) constitute one shift register group 160(1) through 160(j) (i.e., N=2), the number (i.e., N) of shift registers 120(1) through 120(i) that constitute one shift register group 160(1) through 160(j) is not limited thereto. For example, three or more adjacent shift registers 120(1) through 120(i) may constitute one shift register group 160(1) through 160(j). In example embodiments, the first through (j)th shift register groups 160(1) through 160(j) may be connected in a cascade form (i.e., in a serial form). Thus, the first through (j)th shift register groups 160(1) through 160(j) may sequentially output the gate signal.

Specifically, as illustrated in FIG. 1, since the first through (j)th shift register groups 160(1) through 160(j) are connected in a cascade form, the second shift register group 160(2) may output the gate signal after the first shift register group 160(1) outputs the gate signal, the third shift register group 160(3) may output the gate signal after the second shift register group 160(2) outputs the gate signal, and the (j)th shift register group 160(j) may output the gate signal after the (j−1)th shift register group 160(j−1) outputs the gate signal. In other words, connecting the first through (j)th shift register groups 160(1) through 160(j) in a cascade form means arranging the first through (j)th shift register groups 160(1) through 160(j) to sequentially output the gate signal.

The first through (j)th connection control blocks 140(1) through 140(j) may change a connection structure of the N shift registers 120(1) through 120(i) included in each of the first through (j)th shift register groups 160(1) through 160(j) according to whether the stretchable display panel is stretched. That is, as illustrated in FIG. 2, when the stretchable display panel is not stretched, two shift registers 120(1) through 120(i) (i.e., N=2) included in each of the first through (j)th shift register groups 160(1) through 160(j) may simultaneously output the gate signal. As a result, two pixels (i.e., an upper pixel and a lower pixel) connected to the two shift registers 120(1) through 120(i) included in each of the first through (j)th shift register groups 160(1) through 160(j) may operate as one pixel (i.e., indicated by 1 PIXEL on the left side of FIG. 2). On the other hand, when the stretchable display panel is stretched, two shift registers 120(1) through 120(i) (i.e., N=2) included in each of the first through (j)th shift register groups 160(1) through 160(j) may sequentially output the gate signal. As a result, two pixels (i.e., an upper pixel and a lower pixel) connected to the two shift registers 120(1) through 120(i) included in each of the first through (j)th shift register groups 160(1) through 160(j) may independently operate (i.e., indicated by 1 PIXEL on the right side of FIG. 2).

Generally, since a pixel included in the stretchable display panel is stretched as the stretchable display panel is stretched, a pixels-per-inch (or, pixel density) of a stretched panel region of the stretchable display panel may be decreased. Thus, the gate driver 100 may maintain the pixels-per-inch of the stretched panel region by controlling the two pixels connected to the two shift registers 120(1) through 120(i) included in each of the first through (j)th shift register groups 160(1) through 160(j) to operate as one pixel when the stretchable display panel is not stretched and by controlling the two pixels connected to the two shift registers 120(1) through 120(i) included in each of the first through (j)th shift register groups 160(1) through 160(j) to independently operate when the stretchable display panel is stretched.

Specifically, the first through (j)th connection control blocks 140(1) through 140(j) may connect the N shift registers 120(1) through 120(i) included in the (k)th shift register group 160(k) in a cascade form, where k is an integer between 1 and j, when a panel region connected to the (k)th shift register group 160(k) is stretched. As a result, when the panel region connected to the (k)th shift register group 160(k) is stretched, the N shift registers 120(1) through 120(i) included in the (k)th shift register group 160(k) may sequentially output the gate signal via the first through (i)th gate lines GL(1) through GL(i).

For example, as illustrated in FIG. 3, when the first shift register 120(1) and the second shift register 120(2) included in the first shift register group 160(1) are connected in a cascade form as a panel region connected to the first shift register group 160(1) is stretched, an output of the first shift register 120(1) may be connected to an input of the second shift register 120(2). Thus, after the first shift register 120(1) outputs the gate signal via the first gate line GL(1), the second shift register 120(2) may output the gate signal via the second gate line GL(2). In addition, when the third shift register 120(3) and the fourth shift register 120(4) included in the second shift register group 160(2) are connected in a cascade form as a panel region connected to the second shift register group 160(2) is stretched, an output of the third shift register 120(3) may be connected to an input of the fourth shift register 120(4). Thus, after the third shift register 120(3) outputs the gate signal via the third gate line GL(3), the fourth shift register 120(4) may output the gate signal via the fourth gate line GL(4). In other words, connecting the N shift registers 120(1) through 120(i) included in the (k)th shift register group 160(k) in a cascade form means arranging the N shift registers 120(1) through 120(i) included in the (k)th shift register group 160(k) to sequentially output the gate signal in the (k)th shift register group 160(k).

On the other hand, the first through (j)th connection control blocks 140(1) through 140(j) may connect the N shift registers 120(1) through 120(i) included in the (k)th shift register group 160(k) in a parallel form when a panel region connected to the (k)th shift register group 160(k) is not stretched. As a result, when the panel region connected to the (k)th shift register group 160(k) is not stretched, the N shift registers 120(1) through 120(i) included in the (k)th shift register group 160(k) may simultaneously output the gate signal via the first through (i)th gate lines GL(1) through GL(i).

For example, as illustrated in FIG. 4, when the first shift register 120(1) and the second shift register 120(2) included in the first shift register group 160(1) are connected in a parallel form as a panel region connected to the first shift register group 160(1) is not stretched, an input of the first shift register 120(1) may be connected to an input of the second shift register 120(2). Thus, when the first shift register 120(1) outputs the gate signal via the first gate line GL(1), the second shift register 120(2) may output the gate signal via the second gate line GL(2). In addition, when the third shift register 120(3) and the fourth shift register 120(4) included in the second shift register group 160(2) are connected in a parallel form as a panel region connected to the second shift register group 160(2) is not stretched, an input of the third shift register 120(3) may be connected to an input of the fourth shift register 120(4). Thus, when the third shift register 120(3) outputs the gate signal via the third gate line GL(3), the fourth shift register 120(4) may output the gate signal via the fourth gate line GL(4). In other words, connecting the N shift registers 120(1) through 120(i) included in the (k)th shift register group 160(k) in a parallel form means arranging the N shift registers 120(1) through 120(i) included in the (k)th shift register group 160(k) to simultaneously output the gate signal in the (k)th shift register group 160(k).

In an example embodiment, each of the first through (j)th connection control blocks 140(1) through 140(j) may include a plurality of switches that are turned on or off based on a stretch detection signal indicating whether the stretchable display panel is stretched. Here, the stretch detection signal applied to the (k)th connection control block 140(k) may indicate that a panel region connected to the (k)th shift register group 160(k) is stretched when a distance between adjacent gate lines GL(1) through GL(i) in the panel region is longer than or equal to a reference distance and may indicate that a panel region connected to the (k)th shift register group 160(k) is not stretched when a distance between adjacent gate lines GL(1) through GL(i) in the panel region is shorter than the reference distance. Thus, when the stretch detection signal applied to the (k)th connection control block 140(k) indicates that the panel region connected to the (k)th shift register group 160(k) is stretched, the (k)th connection control block 140(k), in response to the stretch detection signal, may turn on the switches for connecting the N shift registers 120(1) through 120(i) included in the (k)th shift register group 160(k) in a cascade form and may turn off the switches for connecting the N shift registers 120(1) through 120(i) included in the (k)th shift register group 160(k) in a parallel form.

On the other hand, when the stretch detection signal applied to the (k)th connection control block 140(k) indicates that the panel region connected to the (k)th shift register group 160(k) is not stretched, the (k)th connection control block 140(k), in response to the stretch detection signal, may turn on the switches for connecting the N shift registers 120(1) through 120(i) included in the (k)th shift register group 160(k) in a parallel form and may turn off the switches for connecting the N shift registers 120(1) through 120(i) included in the (k)th shift register group 160(k) in a cascade form. For example, each of the switches included in each of the first through (j)th connection control blocks 140(1) through 140(j) may be implemented by a p-channel metal oxide semiconductor (PMOS) transistor, an n-channel metal oxide semiconductor (NMOS) transistor, or a complementary metal oxide semiconductor (CMOS) transistor. However, a kind of the switches is not limited thereto.

In another example embodiment, the gate driver 100 may be stretched as the stretchable display panel is stretched. In this case, each of the first through (j)th connection control blocks 140(1) through 140(j) may include conductive connection lines that are physically (or electrically) connected or separated according to whether the stretchable display panel is stretched. For example, when a specific region of the gate driver 100 corresponding to the (k)th shift register group 160(k) is stretched as a panel region connected to the (k)th shift register group 160(k) is stretched, the conductive connection lines for connecting the N shift registers 120(1) through 120(i) included in the (k)th shift register group 160(k) in a cascade form may be connected, and the conductive connection lines for connecting the N shift registers 120(1) through 120(i) included in the (k)th shift register group 160(k) in a parallel form may be separated.

On the other hand, when a specific region of the gate driver 100 corresponding to the (k)th shift register group 160(k) is not stretched as a panel region connected to the (k)th shift register group 160(k) is not stretched, the conductive connection lines for connecting the N shift registers 120(1) through 120(i) included in the (k)th shift register group 160(k) in a parallel form may be connected, and the conductive connection lines for connecting the N shift registers 120(1) through 120(i) included in the (k)th shift register group 160(k) in a cascade form may be separated.

In brief, the gate driver 100 may maintain the pixels-per-inch of a stretched panel region of the stretchable display panel when the stretchable display panel is stretched by grouping adjacent shift registers 120(1) through 120(i) into shift register groups 160(1) through 160(j), by arranging the N shift registers 120(1) through 120(i) included in each of the shift register groups 160(1) through 160(j) in a cascade form when the stretchable display panel is stretched, and by arranging the N shift registers 120(1) through 120(i) included in each of the shift register groups 160(1) through 160(j) in a parallel form when the stretchable display panel is not stretched. Although all of the shift registers in the shift register groups illustrated in FIGS. 3 and 4 are connected in the same manner, it is to be understood that different ones of the shift registers within the shift register groups may be controlled depending on the degree of stretching within that shift register group, i.e., may be different for different shift register groups.

Figure 5:
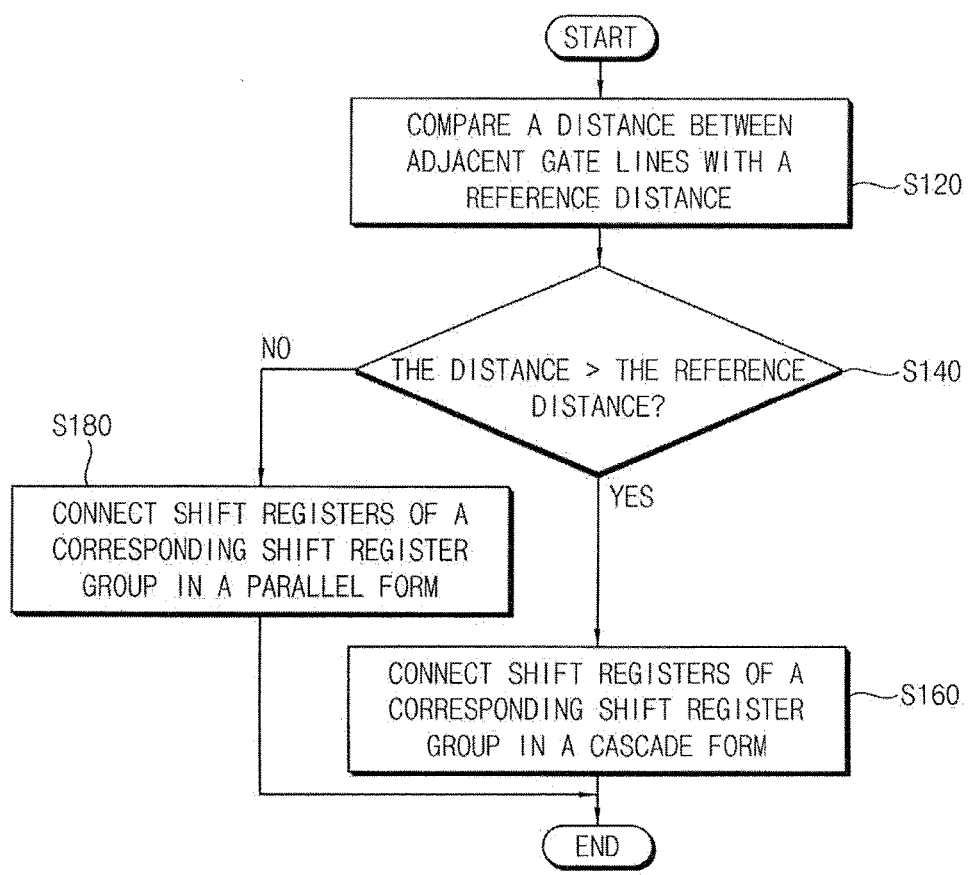
FIG. 5 illustrates a flowchart illustrating an example in which an internal structure of the gate driver of FIG. 1 is changed.
Figure 6A:
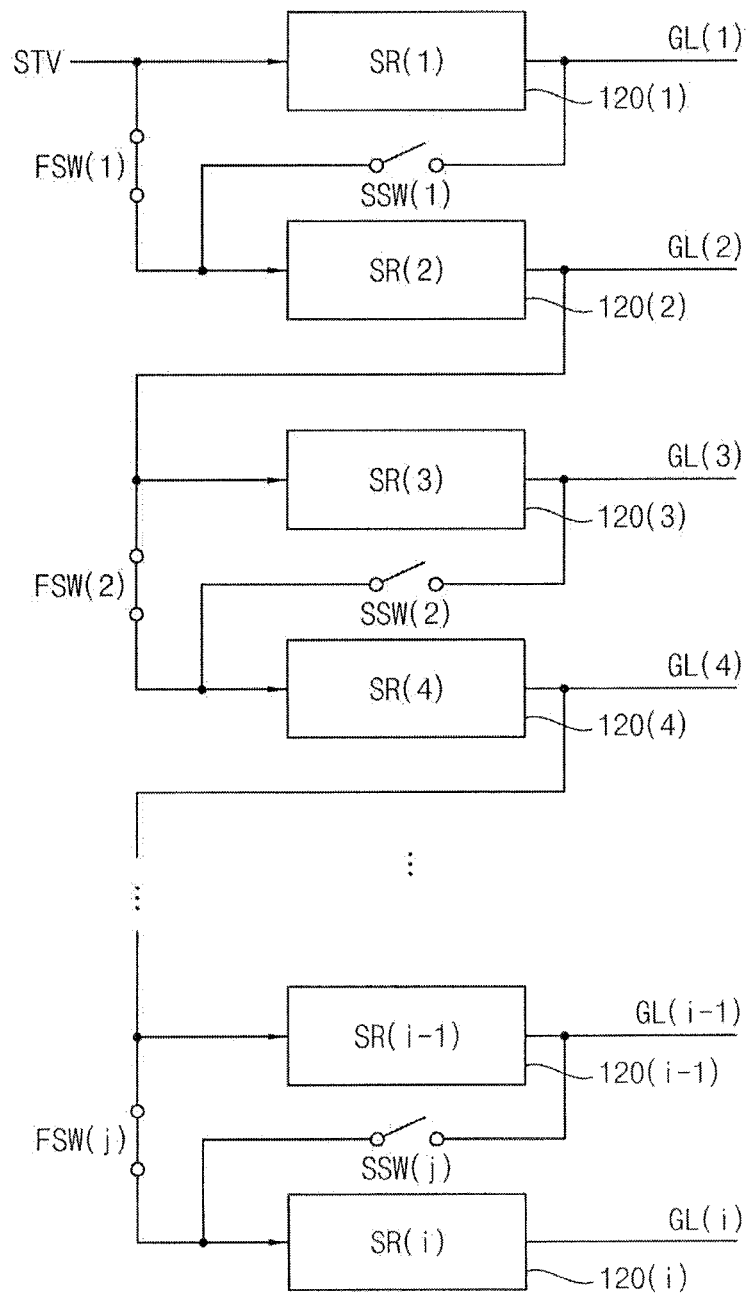
FIGS. 6A and 6B illustrate diagrams for describing an example in which an internal structure of the gate driver of FIG. 1 is changed based on a turn-on operation or a turn-off operation of switches.
Figure 6B:
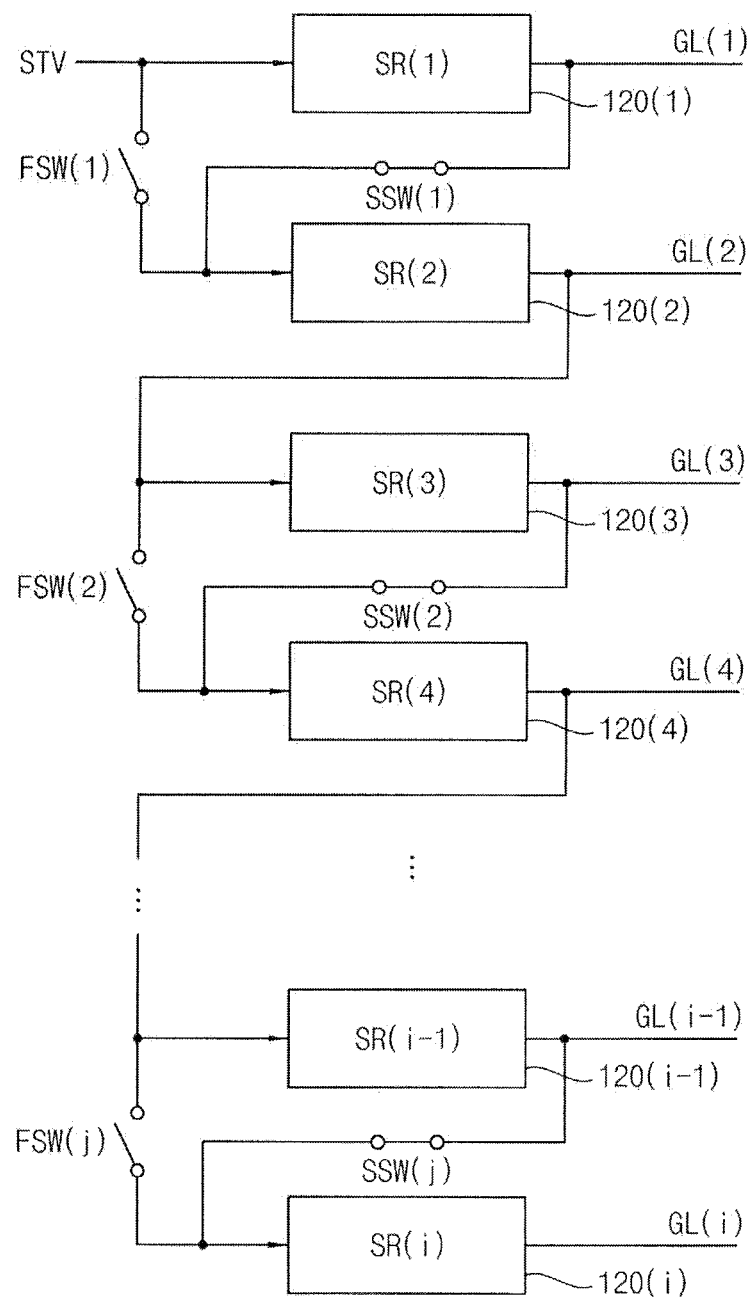
Figure 7A:
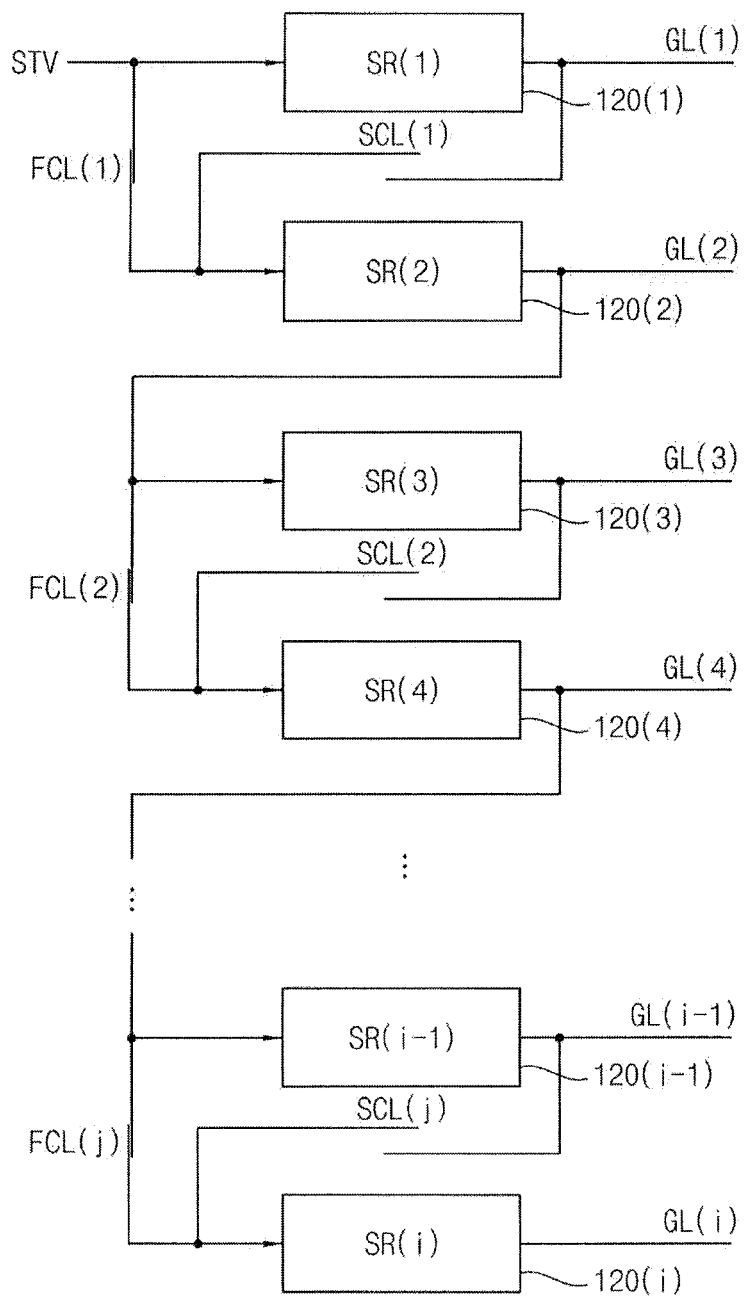
FIGS. 7A and 7B illustrate diagrams for describing an example in which an internal structure of the gate driver of FIG. 1 is changed based on a physical connection or a physical separation of conductive connecting lines.
Figure 7B:
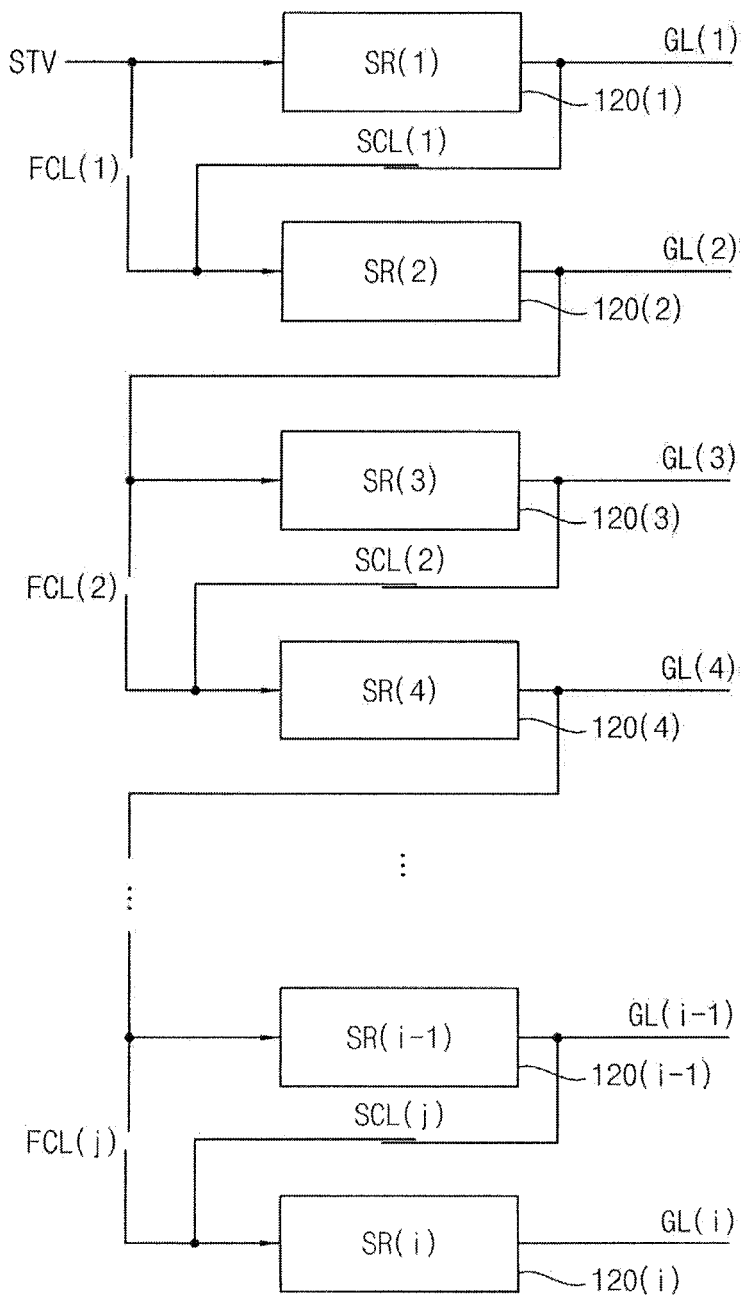

FIG. 5 is a flowchart illustrating an example in which an internal structure of the gate driver of FIG. 1 is changed. FIGS. 6A and 6B are diagrams for describing an example in which an internal structure of the gate driver of FIG. 1 is changed based on a turn-on operation or a turn-off operation of switches. FIGS. 7A and 7B are diagrams for describing an example in which an internal structure of the gate driver of FIG. 1 is changed based on a physical connection or a physical separation of conductive connecting lines.

Referring to FIGS. 5 through 7B, the gate driver 100 may compare a distance between adjacent gate lines GL(1) through GL(i) of the stretchable display panel with a reference distance (S120) and may check whether the distance between the adjacent gate lines GL(1) through GL(i) of the stretchable display panel is longer than or equal to the reference distance (S140). Here, when a first panel region in which the distance between the adjacent gate lines GL(1) through GL(i) of the stretchable display panel is greater than or equal to the reference distance exists, the gate driver 100 may connect the shift registers 120(1) through 120(i) included in the shift register group connected to the first panel region in a cascade form (S160). Thus, the shift registers 120(1) through 120(i) included in the shift register group connected to the first panel region of the stretchable display panel may sequentially output the gate signal via the gate lines GL(1) through GL(i). As a result, the pixels (i.e., an upper pixel and a lower pixel) located in the first panel region of the stretchable display panel may independently operate because the pixels located in the first panel region of the stretchable display panel independently (i.e., sequentially) receive the gate signal. In addition, when a second panel region in which the distance between adjacent gate lines GL(1) through GL(i) of the stretchable display panel is shorter than the reference distance exists, the gate driver 100 may connect the shift registers 120(1) through 120(i) included in the shift register group connected to the second panel region in a parallel form (S180).

Thus, the shift registers 120(1) through 120(i) included in the shift register group connected to the second panel region of the stretchable display panel may simultaneously output the gate signal via the gate lines GL(1) through GL(i). As a result, the pixels (i.e., an upper pixel and a lower pixel) located in the second panel region of the stretchable display panel may operate as one pixel because the pixels located in the second panel region of the stretchable display panel simultaneously receive the gate signal. As described above, since an internal structure of the gate driver 100 differs according to whether the stretchable display panel is stretched (i.e., the shift registers 120(1) through 120(i) included in each shift register group are connected in a cascade form or in a parallel form), the gate driver 100 may maintain the pixels-per-inch (PPI) of a stretched panel region of the stretchable display panel even when the stretchable display panel is stretched.

Although FIG. 5 illustrates an operation S180 to connect shift registers in a shift register group in parallel, the operation of the display may set all shift registers in a corresponding shift register group in parallel as a default setting, such that no action is required when the distance is shorter than the reference distance.

In an example embodiment, as illustrated in FIGS. 6A and 6B, each of the first through (j)th connection control blocks may include a first switch FSW(1) through FSW(j) for connecting two shift registers 120(1) through 120(i) included in each shift register group in a parallel form and a second switch SSW(1) through SSW(j) for connecting two shift registers 120(1) through 120(i) included in each shift register group in a cascade form. Here, the first switch FSW(1) through FSW(j) and the second switch SSW(1) through SSW(j) may be turned on or off based on the stretch detection signal.

For example, as illustrated in FIG. 6A, if no panel region of the stretchable display panel is stretched, the first switch FSW(1) through FSW(j) for connecting two shift registers 120(1) through 120(i) included in each shift register group in a parallel form may be turned on, and the second switch SSW(1) through SSW(j) for connecting two shift registers 120(1) through 120(i) included in each shift register group in a cascade form may be turned off. Thus, two shift registers 120(1) through 120(i) included in each shift register group may simultaneously output the gate signal via the gate lines GL(1) through GL(i), and two pixels (i.e., an upper pixel and a lower pixel) connected to each shift register group may operate as one pixel because the gate signal is simultaneously applied to the two pixels.

When the first switch FSW(1) through FSW(j) is implemented by an n-channel metal oxide semiconductor (NMOS) transistor, a first stretch detection signal applied to the first switch FSW(1) through FSW(j) may have a logic 'high' level. When the first switch FSW(1) through FSW(j) is implemented by an p-channel metal oxide semiconductor (PMOS) transistor, the first stretch detection signal applied to the first switch FSW(1) through FSW(j) may have a logic 'low' level. When the second switch SSW(1) through SSW(j) is implemented by an NMOS transistor, a second stretch detection signal applied to the second switch SSW(1) through SSW(j) may have a logic 'low' level. When the second switch SSW(1) through SSW(j) is implemented by a PMOS transistor, the second stretch detection signal applied to the second switch SSW(1) through SSW(j) may have a logic 'high' level.

On the other hand, as illustrated in FIG. 6B, if all panel regions of the stretchable display panel are stretched, the first switch FSW(1) through FSW(j) for connecting two shift registers 120(1) through 120(i) included in each shift register group in a parallel form may be turned off, and the second switch SSW(1) through SSW(j) for connecting two shift registers 120(1) through 120(i) included in each shift register group in a cascade form may be turned on. Thus, two shift registers 120(1) through 120(i) included in each shift register group may sequentially output the gate signal via the gate lines GL(1) through GL(i), and two pixels (i.e., an upper pixel and a lower pixel) connected to each shift register group may independently operate because the gate signal is independently (i.e., sequentially) applied to the two pixels. When the first switch FSW(1) through FSW(j) is implemented by an NMOS transistor, a first stretch detection signal applied to the first switch FSW(1) through FSW(j) may have a logic 'low' level. When the first switch FSW(1) through FSW(j) is implemented by a PMOS transistor, the first stretch detection signal applied to the first switch FSW(1) through FSW(j) may have a logic 'high' level.

When the second switch SSW(1) through SSW(j) is implemented by an NMOS transistor, a second stretch detection signal applied to the second switch SSW(1) through SSW(j) may have a logic 'high' level. When the second switch SSW(1) through SSW(j) is implemented by a PMOS transistor, the second stretch detection signal applied to the second switch SSW(1) through SSW(j) may have a logic 'low' level.

In another example embodiment, as illustrated in FIGS. 7A and 7B, each of the first through (j)th connection control blocks may include a first conductive connecting line FCL(1) through FCL(j) for connecting two shift registers 120(1) through 120(i) included in each shift register group in a parallel form and a second conductive connecting line SCL(1) through SCL(j) for connecting two shift registers 120(1) through 120(i) included in each shift register group in a cascade form. Here, the first conductive connecting line FCL(1) through FCL(j) and the second conductive connecting line SCL(1) through SCL(j) may be physically (or, electrically) connected or separated as the gate driver 100 is stretched when the stretchable display panel is stretched.

For example, as illustrated in FIG. 7A, if no panel region of the stretchable display panel is stretched, the first conductive connecting line FCL(1) through FCL(j) for connecting two shift registers 120(1) through 120(i) included in each shift register group in a parallel form may be physically connected, and the second conductive connecting line SCL(1) through SCL(j) for connecting two shift registers 120(1) through 120(i) included in each shift register group in a cascade form may be physically separated. Thus, two shift registers 120(1) through 120(i) included in each shift register group may simultaneously output the gate signal via the gate lines GL(1) through GL(i), and two pixels (i.e., an upper pixel and a lower pixel) connected to each shift register group may operate as one pixel because the gate signal is simultaneously applied to the two pixels.

On the other hand, as illustrated in FIG. 7B, if all panel regions of the stretchable display panel are stretched, the first conductive connecting line FCL(1) through FCL(j) for connecting two shift registers 120(1) through 120(i) included in each shift register group in a parallel form may be physically separated, and the second conductive connecting line SCL(1) through SCL(j) for connecting two shift registers 120(1) through 120(i) included in each shift register group in a cascade form may be physically (electrically) connected. Thus, two shift registers 120(1) through 120(i) included in each shift register group may sequentially output the gate signal via the gate lines GL(1) through GL(i), and two pixels (i.e., an upper pixel and a lower pixel) connected to each shift register group may independently operate because the gate signal is independently (i.e., sequentially) applied to the two pixels. Although it is illustrated in FIGS. 6A through 7B that each shift register group includes two shift registers 120(1) through 120(i), the number of the shift registers 120(1) through 120(i) included in each shift register group is not limited thereto.

Figure 8:
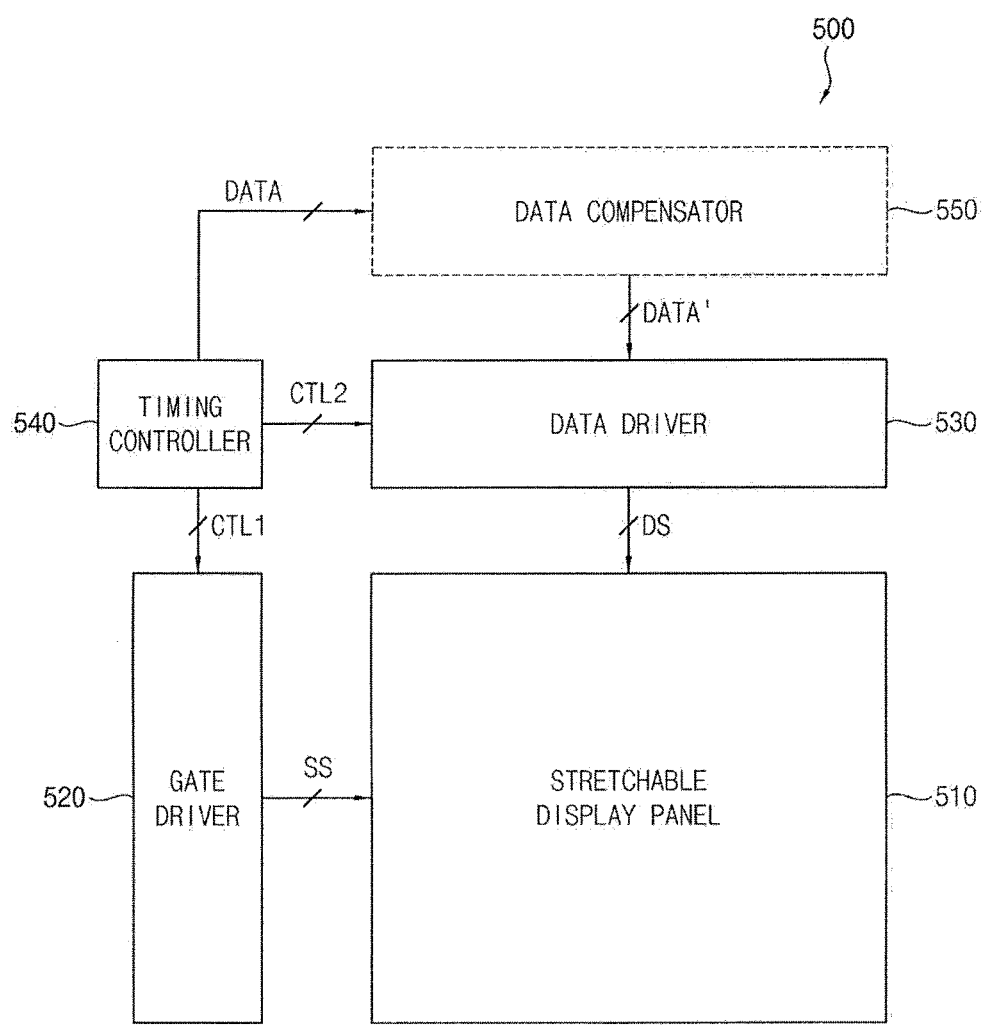
FIG. 8 illustrates a block diagram of a display device according to example embodiments.
Figure 9:
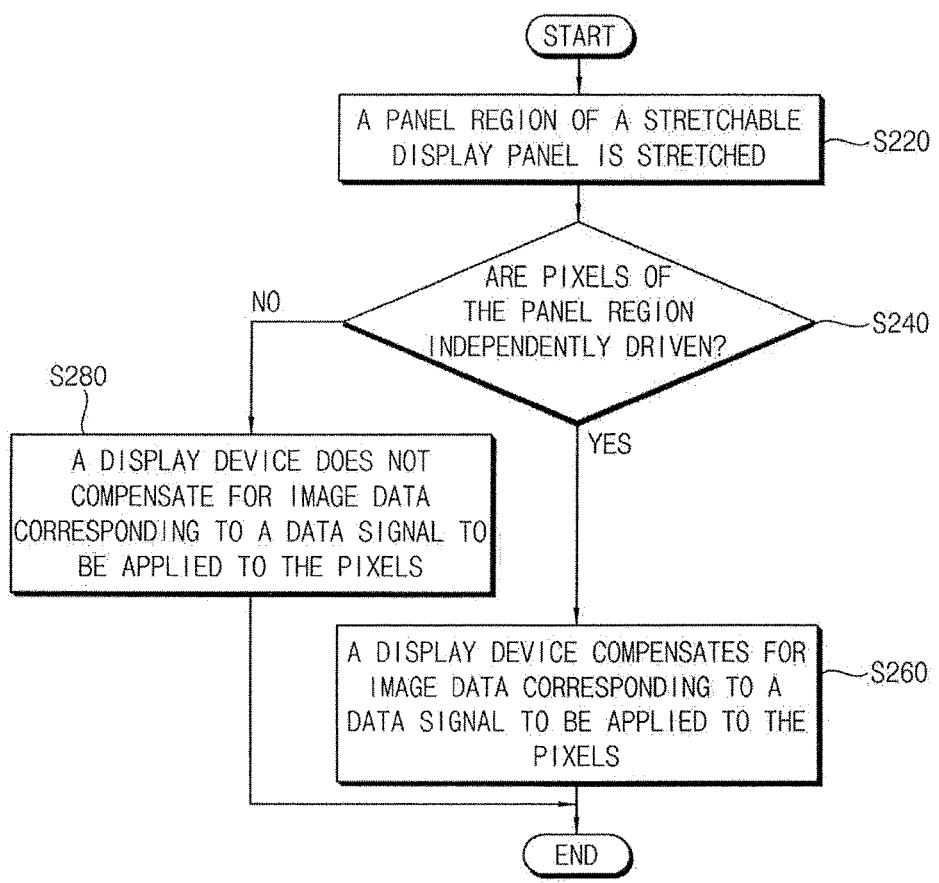
FIG. 9 illustrates a flowchart of an example in which the display device of FIG. 8 operates.
Figure 10A:
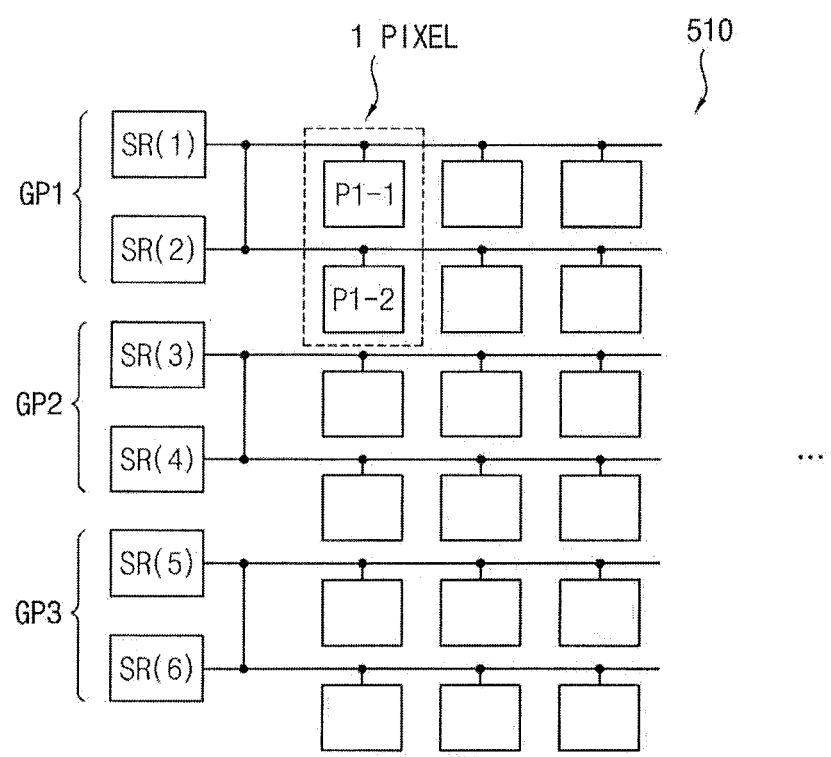
FIGS. 10A and 10B illustrate diagrams for describing an example in which the display device of FIG. 8 operates.
Figure 10B:
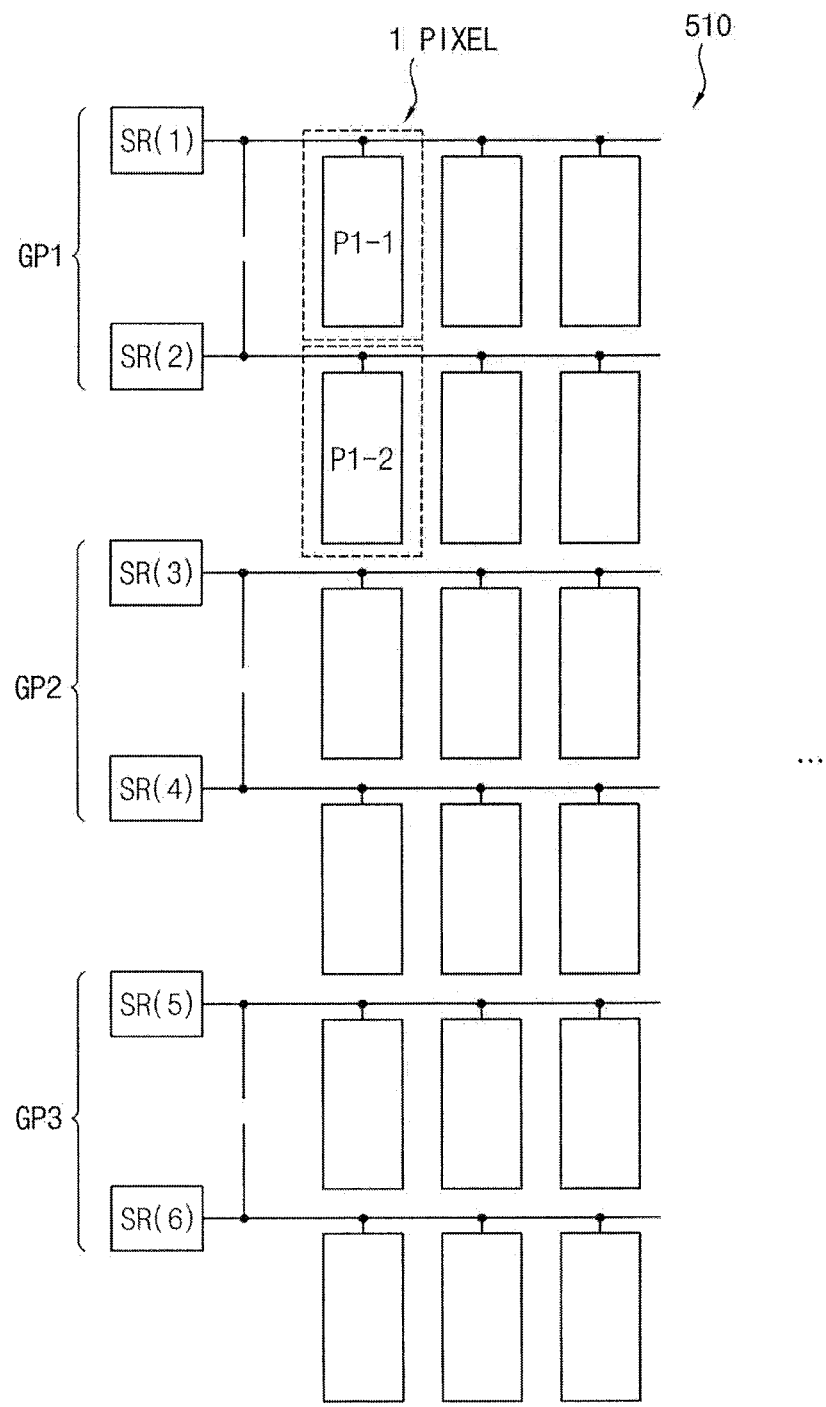

FIG. 8 is a block diagram illustrating a display device according to example embodiments. FIG. 9 is a flowchart illustrating an example in which the display device of FIG. 8 operates. FIGS. 10A and 10B are diagrams for describing an example in which the display device of FIG. 8 operates.

Referring to FIGS. 8 through 10B, the display device 500 may include a stretchable display panel 510, a gate driver 520, a data driver 530, and a timing controller 540. In some example embodiments, the display device 500 may further include a data compensator 550 that performs luminance compensation according to whether the stretchable display panel 510 is stretched. For example, the display device 500 may be an organic light emitting display (OLED) device or a liquid crystal display (LCD) device. However, the display device 500 is not limited thereto.

The stretchable display panel 510 may have elasticity and flexibility. Thus, a size (or, area) of the stretchable display panel 510 may be changed based on its elasticity and flexibility. Here, it should be understood that the stretchable display panel 510 includes a flexible display panel, a bendable display panel, etc. The stretchable display panel 510 may include a plurality of pixels. In the stretchable display panel 510, the pixels may be arranged in a matrix form at locations corresponding to intersecting points of gate lines and data lines. Thus, when the display device 500 includes A gate lines and B data lines, the number of the pixels included in the stretchable display panel 510 may be A×B. The stretchable display panel 510 may be connected to the gate driver 520 via the gate lines. The stretchable display panel 510 may be connected to the data driver 530 via the data lines. Here, since the stretchable display panel 510 is stretched in a up-and-down direction (i.e., in a direction in which the data lines extend), the data lines may have a spring structure in order that the data lines are stretched as the stretchable display panel 510 is stretched. That is, the spring structure of the data lines may prevent the data lines from being cut when the stretchable display panel 510 is stretched.

In some example embodiments, if the stretchable display panel 510 can be stretched in a left-and-right direction (i.e., in a direction in which the gate lines extend), the gate lines may also have a spring structure in order that the gate lines are stretched as the stretchable display panel 510 is stretched. That is, the spring structure of the gate lines may prevent the gate lines from being cut when the stretchable display panel 510 is stretched. The gate driver 520 may provide a gate signal SS to the stretchable display panel 510 via the gate lines. The data driver 530 may provide a data signal DS corresponding to image data DATA to the stretchable display panel 510 via the data lines. In some example embodiments, the display device 500 may further include the data compensator 550. In this case, the data driver 530 may provide a data signal DS corresponding to compensated image data DATA' to the stretchable display panel 510 via the data lines. The timing controller 540 may control the gate driver 520 and the data driver 530. Thus, the timing controller 540 may generate control signals CTL1 and CTL2 to provide the control signals CTL1 and CTL2 to the gate driver 520 and the data driver 530, respectively.

As illustrated in FIGS. 10A and 10B, when the stretchable display panel 510 is stretched, pixels P1-1 and P1-2 included in the stretchable display panel 510 may also be stretched. That is, a pixels-per-inch of a stretched panel region of the stretchable display panel 510 may be decreased. Thus, the pixels P1-1 and P1-2 included in the stretchable display panel 510 may operate as one pixel or may independently operate according to whether the stretchable display panel 510 is stretched. As a result, the pixels-per-inch of the stretched panel region of the stretchable display panel 510 may be maintained regardless of whether the stretchable display panel 510 is stretched.

For example, as illustrated in FIG. 10A, when the stretchable display panel 510 is not stretched, the pixels P1-1 and P1-2 may operate as one pixel (i.e., indicated by 1 PIXEL). That is, the pixels P1-1 and P1-2 may simultaneously receive the gate signal SS from the gate driver 520, and thus the pixels P1-1 and P1-2 may operate as one pixel. On the other hand, as illustrated in FIG. 10B, when the stretchable display panel 510 is stretched, the pixels P1-1 and P1-2 may independently (i.e., sequentially) operate (i.e., indicated by 1 PIXEL). That is, the pixels P1-1 and P1-2 may sequentially receive the gate signal SS from the gate driver 520, and thus the pixels P1-1 and P1-2 may independently operate. For this operation, the gate driver 520 may include a plurality of shift registers SR(1) through SR(6) and a plurality of connection control blocks (not shown). The shift registers SR(1) through SR(6) may be connected to the gate lines of the stretchable display panel 510, respectively. In addition, the shift registers SR(1) through SR(6) may be grouped into a plurality of shift register groups GP1 through GP3. Here, N shift registers SR(1) through SR(6) may constitute each shift register group GP1 through GP3.

For example, it is illustrated in FIGS. 10A and 10B that two shift registers SR(1) through SR(6) constitutes each shift register group GP1 through GP3. The connection control blocks may change a connection structure of the N shift registers SR(1) through SR(6) included in each of the shift register groups GP1 through GP3 according to whether the stretchable display panel 510 is stretched. Here, each of the shift register groups GP1 through GP3 may be connected to grouped pixels included in the stretchable display panel 510 (i.e., the pixels P1-1 and P1-2 illustrated in FIGS. 10A and 10B) via the gate lines.

Specifically, when a panel region connected to a (k)th shift register group (e.g., GP1) is not stretched, the connection control blocks of the gate driver 520 may connect N shift registers (e.g., SR(1) and SR(2)) included in the (k)th shift register group (e.g., GP1) in a parallel form because a distance between the pixels P1-1 and P1-2 located in the panel region is not increased. Thus, as illustrated in FIG. 10A, the N shift registers (e.g., SR(1) and SR(2)) included in the (k)th shift register group (e.g., GP1) may simultaneously output the gate signal SS via the gate lines. On the other hand, when the panel region connected to the (k)th shift register group (e.g., GP1) is stretched, the connection control blocks of the gate driver 520 may connect the N shift registers (e.g., SR(1) and SR(2)) included in the (k)th shift register group (e.g., GP1) in a cascade form because the distance between the pixels P1-1 and P1-2 located in the panel region is increased.

Thus, as illustrated in FIG. 10B, the N shift registers (e.g., SR(1) and SR(2)) included in the (k)th shift register group (e.g., GP1) may independently (i.e., sequentially) output the gate signal SS via the gate lines. Since the shift register groups GP1 through GP3 are connected in a cascade form in the gate driver 520, the shift register groups GP1 through GP3 may sequentially output the gate signal SS regardless of whether the stretchable display panel 510 is stretched. For example, the second shift register group GP2 may output the gate signal SS after the first shift register group GP1 outputs the gate signal SS, and the third shift register group GP3 may output the gate signal SS after the second shift register group GP2 outputs the gate signal SS. In brief, as illustrated in FIGS. 10A and 10B, the N shift registers SR(1) through SR(6) included in each of the shift register groups GP1 through GP3 may simultaneously or sequentially output the gate signal SS according to whether the stretchable display panel 510 is stretched, and the shift register groups GP1 through GP3 may sequentially output the gate signal SS. Since these operations are described above, duplicated description will not be repeated.

In some example embodiments, the display device 500 may further include the data compensator 550 that compensates for the image data DATA to output the compensated image data DATA' according to whether the stretchable display panel 510 is stretched. Specifically, as illustrated in FIG. 9, when a panel region of the stretchable display panel 510 is stretched (S220), the display device 500 may check whether the pixels P1-1 and P1-2 included in the panel region of the stretchable display panel 510 are independently driven (S240).

Here, as illustrated in FIG. 10B, when the pixels P1-1 and P1-2 included in the panel region of the stretchable display panel 510 are independently driven, the display device 500, by using the data compensator 550, may compensate for the image data DATA corresponding to the data signal DS to be applied to the pixels P1-1 and P1-2 included in the panel region of the stretchable display panel 510 (S260). That is, the data compensator 550 of the display device 500 may perform the luminance compensation because luminance per unit area of the stretchable display panel 510 is reduced (or, degraded) when a distance between the pixels P1-1 and P1-2 included in the panel region of the stretchable display panel 510 is longer than or equal to a reference distance.

On the other hand, as illustrated in FIG. 10A, when the pixels P1-1 and P1-2 included in the panel region of the stretchable display panel 510 are not independently driven, the display device 500 may not compensate for the image data DATA corresponding to the data signal DS to be applied to the pixels P1-1 and P1-2 included in the panel region of the stretchable display panel 510 (S280). That is, the data compensator 550 of the display device 500 may not perform the luminance compensation when the distance between the pixels P1-1 and P1-2 included in the panel region of the stretchable display panel 510 is shorter than the reference distance.

In an example embodiment, as illustrated in FIG. 8, the data compensator 550 may be located outside the timing controller 540 and the data driver 530. In another example embodiment, the data compensator 550 may be located inside the timing controller 540 or the data driver 530. As described above, the display device 500, by using the gate driver 520 that maintains the pixels-per-inch of the stretched panel region of the stretchable display panel 510 when the stretchable display panel 510 is stretched, may prevent image distortion and luminance degradation of the stretchable display panel 510 when the stretchable display panel 510 is stretched. As a result, the display device 500 may provide a high-quality image to a viewer regardless of whether the stretchable display panel 510 is stretched. Although it is described above that the display device 500 includes the stretchable display panel 510, the gate driver 520, the data driver 530, the timing controller 540, and/or the data compensator 550, the display device 500 may further include other components. For example, the display device 500 may further include a power supply that provides the stretchable display panel 510 with power voltages.

Figure 11:
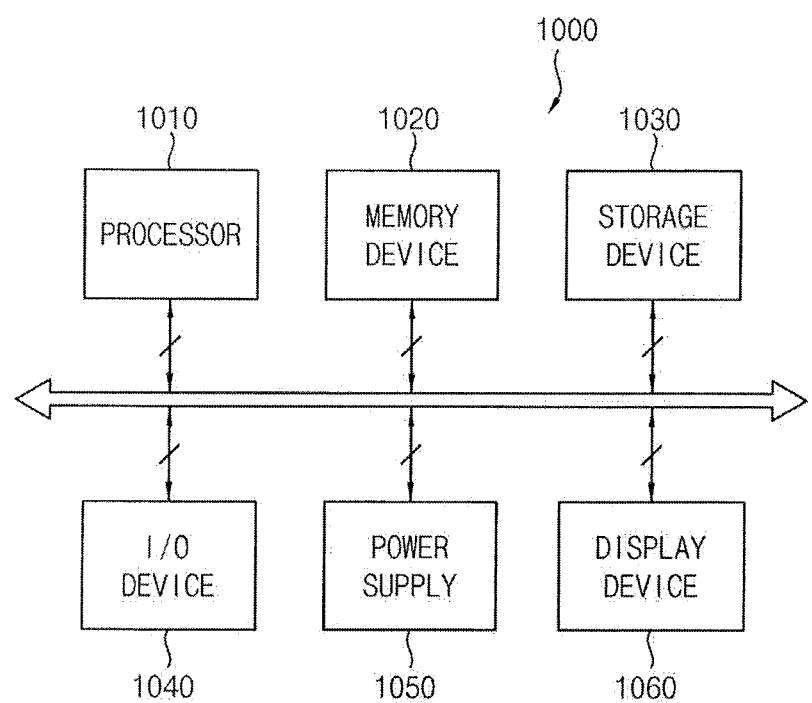
FIG. 11 illustrates a block diagram of an electronic device according to example embodiments.
Figure 12:
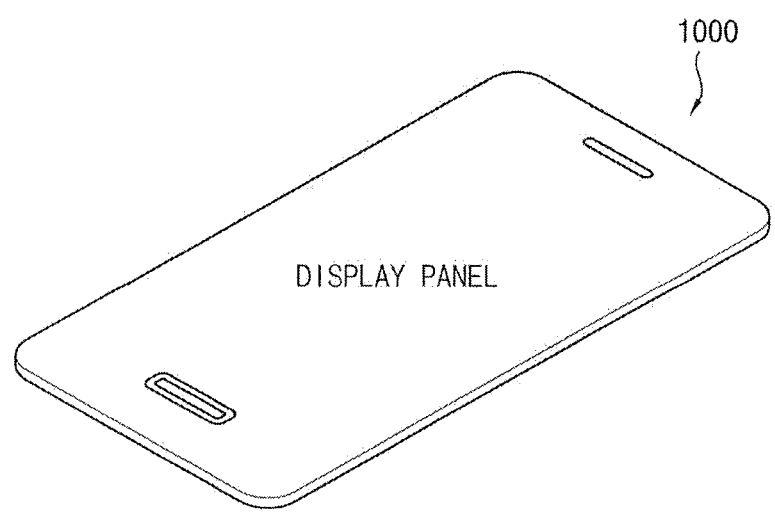
FIG. 12 illustrates a diagram of an example in which the electronic device of FIG. 11 is implemented as a smart phone.

FIG. 11 is a block diagram illustrating an electronic device according to example embodiments. FIG. 12 is a diagram illustrating an example in which the electronic device of FIG. 11 is implemented as a smart phone.

Referring to FIGS. 11 and 12, the electronic device 1000 may include a processor 1010, a memory device 1020, a storage device 1030, an input/output (I/O) device 1040, a power supply 1050, and a display device 1060. Here, the display device 1060 may correspond to a display device 500 of FIG. 8. In addition, the electronic device 1000 may further include a plurality of ports for communicating a video card, a sound card, a memory card, a universal serial bus (USB) device, other electronic devices, etc. In an example embodiment, as illustrated in FIG. 12, the electronic device 1000 may be implemented as a smart phone. However, the electronic device 1000 is not limited thereto. For example, the electronic device 1000 may be implemented as a television, a computer monitor, a laptop, a digital camera, a cellular phone, a smart pad, a tablet PC, a navigation system, a video phone, a head mounted display (HMD), etc.

The processor 1010 may perform various computing functions. The processor 1010 may be a micro processor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus. The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile DRAM device, etc. The storage device 1030 may include a solid state drive (SSD) device, a hard disk drive (HDD) device, a CD-ROM device, etc. The I/O device 1040 may include an input device such as a keyboard, a keypad, a mouse device, a touchpad, a touch-screen, etc., and an output device such as a printer, a speaker, etc. In some example embodiments, the display device 1060 may be included in the I/O device 1040. The power supply 1050 may provide power for operations of the electronic device 1000.

The display device 1060 may be coupled to other components via the buses or other communication links. In an example embodiment, the display device 1060 may be an organic light emitting display device or a liquid crystal display device. However, the display device 1060 is not limited thereto. As described above, the display device 1060 may include a stretchable display panel. Here, the display device 1060 may provide a high-quality image to a viewer regardless of whether the stretchable display panel is stretched by preventing image distortion and luminance degradation of the stretchable display panel when the stretchable display panel is stretched. To this end, the display device 1060 may include the stretchable display panel that includes a plurality of pixels, a gate driver that provides a gate signal to the stretchable display panel via gate lines, a data driver that provides a data signal corresponding to image data to the stretchable display panel via data lines, and a timing controller that controls the gate driver and the data driver.

In example embodiments, the gate driver may include a plurality of shift registers and a plurality of connection control blocks. The shift registers may be connected to the gate lines of the stretchable display panel, respectively. In addition, the shift registers may be grouped into a plurality of shift register groups. Here, N shift registers that are adjacent to each other may constitute one shift register group, where N is an integer greater than or equal to 2. The connection control blocks may change a connection structure of the N shift registers included in each of the shift register groups according to whether the stretchable display panel is stretched. In some example embodiments, the display device 1060 may further include a data compensator that compensates for the image data (i.e., compensates for the luminance degradation of the stretchable display panel) according to whether the stretchable display panel is stretched. In this case, the display device 1060, by using the data compensator, may prevent the luminance degradation that occurs when the stretchable display panel is stretched. Since the display device 1060 is described above, duplicated descriptions will not be repeated.

The embodiments may be applied to a system (or, electronic device) including a display device. For example, the present inventive concept may be applied to a television, a computer monitor, a head mounted display, a laptop, a digital camera, a cellular phone, a smart phone, a smart pad, a smart watch, a tablet PC, a navigation system, a video phone, etc.

By way of summation and review, some example embodiments provide a gate driver capable of driving a stretchable display panel to maintain (or keep) a pixels-per-inch of a stretched panel region of the stretchable display panel when the stretchable display panel is stretched. Some example embodiments provide a display device including the gate driver capable of preventing image distortion and luminance degradation of the stretchable display panel when the stretchable display panel is stretched. In addition, a display device including the gate driver according to example embodiments may prevent (or alleviate, reduce, etc.) image distortion and luminance degradation of the stretchable display panel when the stretchable display panel is stretched.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A gate driver, comprising:
   a plurality of shift registers including input terminals and output terminals, the output terminals of the plurality of shift registers connected to a plurality of gate lines of a stretchable display panel, respectively, the shift registers being grouped into a plurality of shift register groups, each of the shifting register groups including N adjacent shift registers, where N is an integer greater than or equal to 2; and
   a plurality of connection controllers to change a connection structure of the input terminals and the output terminals of the N adjacent shift registers included in the each of the shift register groups according to whether a physical dimension of the stretchable display panel is changed by stretching of the stretchable display panel, wherein:
   the stretchable display panel has a first size and a second size different from each other according to stretching thereof,
   when the stretchable display panel has the first size, the input terminals of the N adjacent shift registers are commonly connected to each other, and
   when the stretchable display panel has the second size, the input terminals of the N adjacent shift registers are separated from each other, and wherein
   the N adjacent shift registers output gate signal regardless of whether the input terminals of the N adjacent shift registers are commonly connected to each other or separated from each other.

2. The gate driver as claimed in claim 1, wherein the shift register groups are connected in a cascade form to sequentially output a gate signal.

3. The gate driver as claimed in claim 1, wherein the connection controllers connect the N adjacent shift registers included in the (k)th shift register group in a cascade form when a panel region connected to the (k)th shift register group is stretched, where k is an integer greater than or equal to 1.

4. The gate driver as claimed in claim 3, wherein the N adjacent shift registers included in the (k)th shift register group sequentially output a gate signal via the gate lines when the panel region connected to the (k)th shift register group is stretched.

5. The gate driver as claimed in claim 1, wherein the connection controllers connect the N adjacent shift registers included in the (k)th shift register group in a parallel form by commonly connecting the input terminals of the N adjacent shift registers when a panel region connected to the (k)th shift register group is not stretched, where k is an integer greater than or equal to 1.

6. The gate driver as claimed in claim 5, wherein the N adjacent shift registers included in the (k)th shift register group simultaneously receive a same input signal through the input terminals being commonly connected and simultaneously output a gate signal via the gate lines when the panel region connected to the (k)th shift register group is not stretched.

7. The gate driver as claimed in claim 1, wherein each of the connection controllers includes a plurality of switches that are turned on or off based on a stretch detection signal indicating whether the stretchable display panel is stretched.

8. The gate driver as claimed in claim 7, wherein:
   the stretch detection signal indicates that a panel region connected to the (k)th shift register group is stretched when a distance between the gate lines included in the panel region connected to the (k)th shift register group is longer than or equal to a reference distance, where k is an integer greater than or equal to 1; and
   the stretch detection signal indicates that the panel region connected to the (k)th shift register group is not stretched when the distance between the gate lines included in the panel region connected to the (k)th shift register group is shorter than the reference distance.

9. The gate driver as claimed in claim 7, wherein each of the switches is implemented by a p-channel metal oxide semiconductor (PMOS) transistor, an n-channel metal oxide semiconductor (NMOS) transistor, or a complementary metal oxide semiconductor (CMOS) transistor.

10. The gate driver as claimed in claim 1, wherein the gate driver is stretched as the stretchable display panel is stretched.

11. The gate driver as claimed in claim 10, wherein each of the connection controllers includes a plurality of conductive connecting lines that are physically connected or separated according to whether the stretchable display panel is stretched.

12. A display device, comprising:
   a stretchable display panel including a plurality of pixels;
   a gate driver to provide a gate signal to the stretchable display panel via a plurality of gate lines;
   a data driver to provide a data signal corresponding to image data to the stretchable display panel via a plurality of data lines; and
   a timing controller to control the gate driver and the data driver, wherein the gate driver includes:
   a plurality of shift registers including input terminals and output terminals, the output terminals of the plurality of shift registers connected to the gate lines of the stretchable display panel, respectively, the shift registers being grouped into a plurality of shift register groups, each of the shifting register groups including N adjacent shift registers, where N is an integer greater than or equal to 2; and a plurality of connection controllers to change a connection structure of the input terminals and the output terminals of the N adjacent shift registers included in the each of the shift register groups according to whether a physical dimension of the stretchable display panel is changed by stretching of the stretchable display panel, wherein the stretchable display panel has a first size and a second size different from each other according to stretching thereof, when the stretchable display panel has the first size, the input terminals of the N adjacent shift registers are commonly connected to each other, and when the stretchable display panel has the second size, the input terminals of the N adjacent shift registers are separated from each other, and wherein the N adjacent shift registers output gate signal regardless of whether the input terminals of the N adjacent shift registers are commonly connected to each other or separated from each other.

13. The display device as claimed in claim 12, further comprising:
a data compensator to compensate for the image data according to whether the stretchable display panel is stretched.

14. The display device as claimed in claim 13, wherein the data compensator is located inside the timing controller or the data driver.

15. The display device as claimed in claim 13, wherein the data compensator is located outside the timing controller and the data driver.

16. The display device as claimed in claim 12, wherein the shift register groups are connected in a cascade form to sequentially output the gate signal.

17. The display device as claimed in claim 12, wherein the connection controllers connect the N adjacent shift registers included in the (k)th shift register group in a cascade form when a panel region connected to the (k)th shift register group is stretched, where k is an integer greater than or equal to 1.

18. The display device as claimed in claim 17, wherein the N adjacent shift registers included in the (k)th shift register group sequentially output the gate signal via the gate lines when the panel region connected to the (k)th shift register group is stretched.

19. The display device as claimed in claim 12, wherein the connection controllers connect the N adjacent shift registers included in the (k)th shift register group in a parallel form by commonly connecting the input terminals of the N adjacent shift registers when a panel region connected to the (k)th shift register group is not stretched, where k is an integer greater than or equal to 1.

20. The display device as claimed in claim 19, wherein the N adjacent shift registers included in the (k)th shift register group simultaneously receive a same input signal through the input terminals being commonly connected and simultaneously output the gate signal via the gate lines when the panel region connected to the (k)th shift register group is not stretched.

* * * * *